United States Patent
Parazak

[19]
[11] Patent Number: 6,102,996
[45] Date of Patent: Aug. 15, 2000

[54] INK-JET INKS COMPRISING PIGMENT PRECURSORS

[75] Inventor: Dennis P Parazak, Corvallis, Oreg.

[73] Assignee: Hewlett-Packard Company, Palo Alto, Calif.

[21] Appl. No.: 08/989,549

[22] Filed: Dec. 12, 1997

[51] Int. Cl.[7] ................................................ C09D 11/02
[52] U.S. Cl. ................. 106/31.25; 106/31.6; 106/31.75; 106/31.77; 106/31.78; 106/31.79; 106/31.86; 106/31.88; 106/31.89; 106/493; 106/494; 106/495; 106/496; 106/497; 106/498
[58] Field of Search ................... 106/493, 494, 106/495, 496, 497, 498, 31.27, 31.43, 31.44, 31.6, 31.25, 31.75, 31.77, 31.78, 31.79, 31.86, 31.88, 31.89

[56] References Cited

U.S. PATENT DOCUMENTS

| | | | |
|---|---|---|---|
| 5,234,634 | 8/1993 | Janoff et al. | 264/4.1 |
| 5,484,943 | 1/1996 | Zambounis et al. | 548/453 |
| 5,531,816 | 7/1996 | Wickramanayake | 106/31.78 |
| 5,561,232 | 10/1996 | Hao et al. | 546/14 |
| 5,626,654 | 5/1997 | Breton et al. | 106/31.33 |
| 5,713,989 | 2/1998 | Wickramanayake et al. | 106/31.6 |
| 5,788,749 | 8/1998 | Breton et al. | 106/31.6 |
| 5,830,267 | 11/1998 | Zambounis et al. | 106/413 |

FOREIGN PATENT DOCUMENTS

| | | | |
|---|---|---|---|
| 0483412A1 | 10/1990 | European Pat. Off. | G03F 7/34 |
| 0586079A1 | 3/1994 | European Pat. Off. | C09D 11/00 |
| 0654711A1 | 11/1994 | European Pat. Off. | G03F 7/004 |
| 0648770A2 | 4/1995 | European Pat. Off. | C07D 48/04 |
| 0648817A1 | 4/1995 | European Pat. Off. | C09B 69/08 |
| 0742255A1 | 11/1996 | European Pat. Off. | C08K 5/00 |

OTHER PUBLICATIONS

"Latent pigments activated by heat" published in Nature on Jul. 10, 1997, vol. 388, pp. 131–132.

*Primary Examiner*—Helene Klemanski

[57] ABSTRACT

A pigment-based ink composition is provided which employs a pigment precursor that is soluble in a non-aqueous solvent. Preferably, the ink composition is in the form of an aqueous, two-phase system wherein the pigment precursor is solubilized in a high boiling, water-insoluble organic compound. Optionally, a second high boiling compound miscible with both aqueous and organic phases and at least one amphiphile are also present.

20 Claims, 1 Drawing Sheet

INK-JET INKS COMPRISING PIGMENT PRECURSORS

FIELD OF INVENTION

The present invention relates to ink compositions employed in ink-jet printing; in particular, the ink-jet ink compositions herein comprise soluble pigment precursors which transform into insoluble pigments on the print media after treatment with chemicals, heat, or radiation.

BACKGROUND OF INVENTION

Ink-jet printing is a non-impact printing process in which droplets of ink are deposited on print media, such as paper, transparency film, or textiles. Low cost and high quality of the output, combined with relatively noise-free operation, have made ink-jet printers a popular alternative to other types of printers used with computers. Essentially, ink-jet printing involves the ejection of fine droplets of ink onto print media in response to electrical signals generated by a microprocessor.

There are two basic means currently available for achieving ink droplet ejection in ink-jet printing: thermally and piezoelectrically. In thermal ink-jet printing, the energy for drop ejection is generated by electrically-heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

Inks useful in ink-jet printing are typically composed of either pigments or dyes. Pigments are very small insoluble solid colorant particles wherein the molecules are strongly associated with one another through intermolecular forces such as Van der Waals attraction, pi-pi interactions or hydrogen bonding. These forces of attraction prevent solvation of the molecules by common solvents such that they cannot form solutions like their dye counterparts. Conventionally, pigments are used in printing inks by suspending them in a liquid medium using a high-energy dispersion process with the aid of dispersing agents. A disadvantage of using pigments is that their dispersions are inherently thermodynamically unstable and eventually the pigment particles agglomerate to larger particles that tend to settle. Moreover, pigments lack uniform size distribution. Agglomerated and/or non-uniform sized particles lead to "bleeding" of the inks into one another when printed in various colors on paper substrates ink. In addition to bleed, the use of these pigments lead to longer drying time of the ink on the print media and to problems with pen reliability due to clogging and crusting of the ink in the pen mechanism.

Technology has been developed to encapsulate pigments to reduce agglomerization and provide more uniform size distribution. Surface modifications not involving encapsulating that render the pigment surface appropriate for suspension in solvents are also known. Other proposed solutions to the problem of pigment agglomeration are disclosed U.S. Pat. No. 5,531,816, entitled "Bleed-Alleviated, Waterfast, Pigment-Based Ink-Jet Ink Compositions," and U.S. Pat. No. 5,713,989 entitled "Bleed Alleviated Aqueous Pigment Dispersion-Based Ink-Jet Ink Compositions," both assigned to the same assignee as the present application. These disclosures are directed to bleed control of solvent-dispersed pigment-based and aqueous pigment-based ink-jet ink compositions, respectively. More specifically, bleed control for such inks is achieved by dispersing the deagglomerated pigment in solution by means of a microemulsion.

Although these solutions are promising, a need still exists for pigment-based inks for use in ink-jet printing that evidence reduced agglomeration, and thereby, reduced bleed, rapid drying upon impact with the print medium, and enhanced reliability in performance. Moreover, the print quality of the ink composition must not be sacrificed in order to achieve these performance benefits.

Recent literature has described a method for modifying insoluble pigments such that they are made soluble in organic solvents by introducing substituents that disrupt Van der Waals and pi-pi interactions and/or remove the ability of the pigment molecules to form intermolecular hydrogen bonds. These chemically modified pigments can then be converted back to their native form by the application of heat or radiation. These pigment precursors have been termed "latent" pigments.

SUMMARY OF THE INVENTION

In accordance with the invention, ink-jet ink compositions are provided which employ a latent pigment (or pigment precursor) that is soluble in a water-insoluble organic solvent. Other embodiments herein may additionally comprise water and at least one amphiphile present in an amount sufficient to solubilize the water-insoluble organic compound. The ink-jet inks of this invention may be in the form of non aqueous compositions or an aqueous emulsion, microemulsion, or liposome wherein the pigment precursors are soluble in the discontinuous, nonaqueous phase. The solubility of the pigment precursor in the organic solvents allows for ink formulations without the addition of dispersing agents, binders, polymers, or prepolymers typically required for stable pigment-based inks.

Colorant precursors suitable for use in this invention are compatible with the remaining components in the ink-jet ink composition. As used herein, the term "high boiling organic compound" refers to an organic compound having a vapor pressure that is sufficiently low in comparison to that of water so that only water evaporates from the ink during the normal operation of ink-jet.

A method of reducing bleed in ink-jet printing is also provided which involves providing the above-described ink and printing the same onto a print medium. Since typical color ink-jet printers employ an ink set having three color inks and a single black ink, it is contemplated that any or all of the four inks may be formulated according to the present invention to achieve high quality printing with reduced bleed. Preferably, all four inks in a set of ink-jet inks would be formulated in accordance with the invention such that the print quality optimally benefits from improved dry time, bleed control, uniformity of coverage and thickness, and enhanced reliability.

While even the non-aqueous ink-jet inks of this invention exhibit fast dry times and bleed control, ink manufacturers may choose to formulate aqueous emulsion, microemulsion or liposome ink compositions by selecting the proper amphiphile. It is believed that the presence of an amphiphile acts to reduce the interfacial tension between the water and the water-insoluble organic compound, thus forming a two-phase stable system The present ink-jet ink compositions and method of reducing bleed and enhancing pen reliability may be used with a variety of ink-jet printers such as continuous, piezoelectric drop-on-demand printers and thermal or bubble jet drop-on-demand printers. Printing may be done on a variety of media; examples include paper, textiles, and transparencies. The reduction of bleed and dry time improvement achieved in the practice of the invention enable ink-jet printers to effect high print qualities in a cost effective manner.

All concentrations herein are in weight percent, unless otherwise indicated. The purity of all components is that employed in normal commercial practice for ink-jet inks.

DETAILED DESCRIPTION OF THE INVENTION

Water-insoluble Organic Compound

Figure 1:
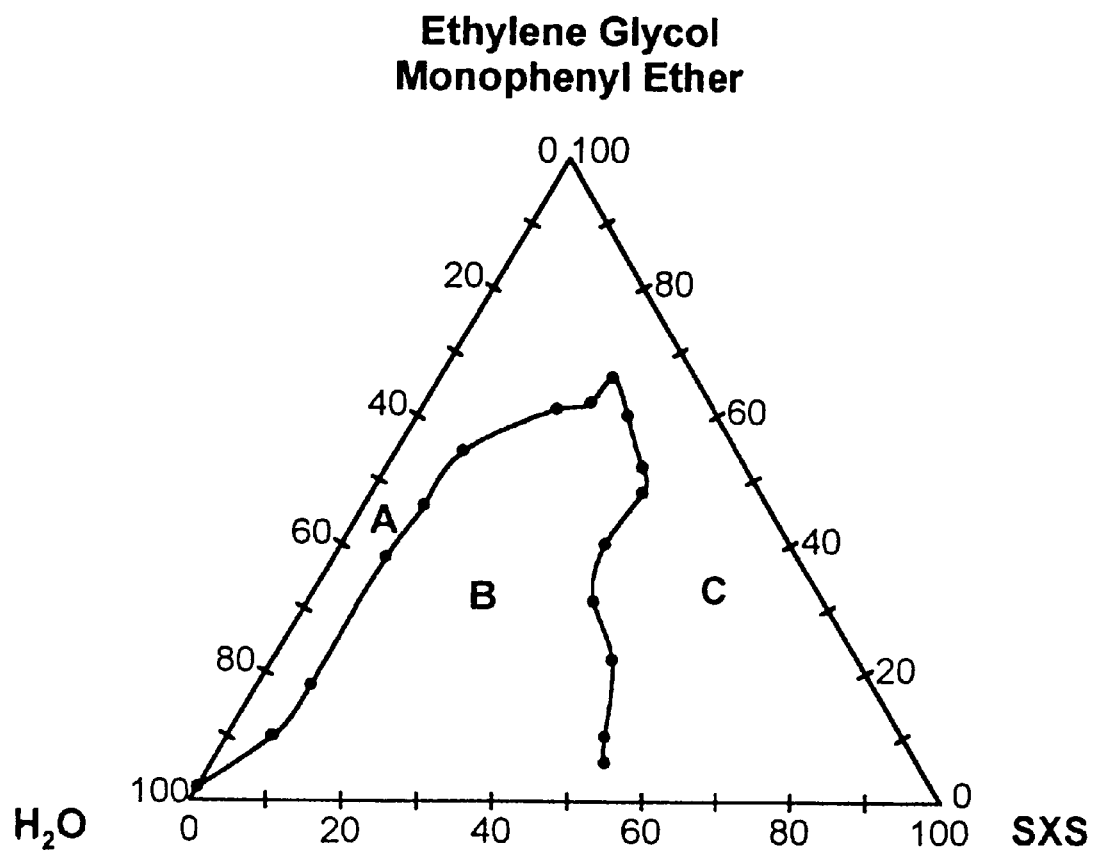
FIG. 1 is a ternary phase diagram showing the composition region of use for ink-jet ink compositions having a particular combination of organic compounds, amphiphile, and water.

Examples of water-insoluble organic compounds that may be suitably employed in the practice of the invention include, but are not limited to, water-insoluble ethyleneoxy- and propyleneoxy- oils; water-insoluble mono- or polyglycol ethers; water-insoluble mono- or polyglycol phenyl ethers; water-insoluble alcohols; water-insoluble polyols; water-insoluble mono- or polyglycol esters; water-insoluble terpenes; water-insoluble phenols; water-insoluble aldehydes and ketones; water-insoluble hydrocarbons; and water-insoluble polyether modified polysiloxanes. In general, any water-insoluble organic compound, or combination thereof, may be employed in the practice of the invention so long as it solubilizes the pigment precursor and so long as it is compatible with the other components in the ink-jet ink composition. Specific examples of water-insoluble organic compounds that are preferably employed in the practice of the invention include, but are not limited to: (1) ethylene, propylene, polyethylene, and polypropylene glycol phenyl ethers; (2) ethylene, propylene, polyethylene, and polypropylene glycol esters such as acrylates; and (3) benzyl alcohol.

Additional, examples of hydrocarbons include toluene, xylenes, naphthalene, and phenanthrene. Further examples of the water-insoluble organic compounds include alpha-terpineol, citronellal, hydroxy citronellal, cyclohexyl methanol, cyclohexanone and its alkyl ($C_1$ to $C_8$) derivatives, cyclohexanol and its alkyl ($C_1$ to $C_8$) derivatives, cyclopentanone and its alkyl ($C_1$ to $C_8$) derivatives, cyclopentanol and its alkyl ($C_1$ to $C_8$) derivatives, eugenol, 1-heptanol, n-hexanol, 2-hexanol, n-pentanol, cinnamyl alcohol, 2-ethyl-1,3-hexanediol, 7-octene-1,2-diol, 2,2-diethyl-1,3-propanediol, 1-benzyl-2-pyrrolidinone, polycaprolactone triol, cinnamaldehyde, m-cresol, 3-phenyl-1-propanol, salicylaldehyde and water-insoluble polyether modified polysiloxanes such as GP-226 available from Genesee Polymers (Flint, Mich.) and Addid 210 available from Wacker (Adrian, Mich.). Mono- and diethylene glycol phenyl ether, mono- and dipropylene glycol phenyl ether, and benzyl alcohol are also preferably employed in the practice of the invention.

The water-insoluble organic compound may range in concentration from about 1% to about 99%, preferably from about 1% to about 70%, more preferably from about 3% to about 30%, by weight of the ink-jet ink composition.

Pigment Precursor

The pigment precursors are represented by the formula

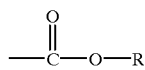

wherein B is a colorant substructure containing at least one N atom, z is from about 1 to about 6, Z is represented by the formulae:

$$-\!\!-\!\!\overset{\overset{\displaystyle O}{\|}}{C}\!\!-\!\!O\!\!-\!\!R$$

where R is an alkyl, alkenyl, alkynyl, or substituted alkyl, alkenyl, alkynyl group. This group is responsible for disrupting or eliminating the intermolecular hydrogen-bonding between pigment molecules which are responsible for rendering the pigment insoluble in most solvents. R is selected to be sufficiently bulky in size in order to weaken the pi-pi and Van der Waals interactions between molecules in planar, closely packed systems (such as in phthalocyanines). Examples of R groups suitably employed in the present invention include, but are not limited to, ethyl, tert-butyl, benzyl, allyl, tert-amyl and isopropyl. The selection of suitable R groups is deemed within the ability of those skilled in the art. Without being limited, the substituted or unsubstituted R group will typically comprise from about 2 to about 10 carbons.

The Z moiety is bonded to the B substructure through a N atom. However, it is not necessary that all N atoms in B are bonded to Z moieties. Thus, the molecule $B(Z)_z$ may contain several N groups, at least one of which can be found in B and is linked to Z.

B is a substructure of known nitrogen containing chromophores, preferably selected from quinacridone-, anthraquinone-, perylene-, indigo-, quinophthalone-, isoindolinone-, isoindoline-, dioxazine-, diketopyrrolopyrrole-, phthalocyanine- or azo series.

Specific examples of suitable pigment substructures include:

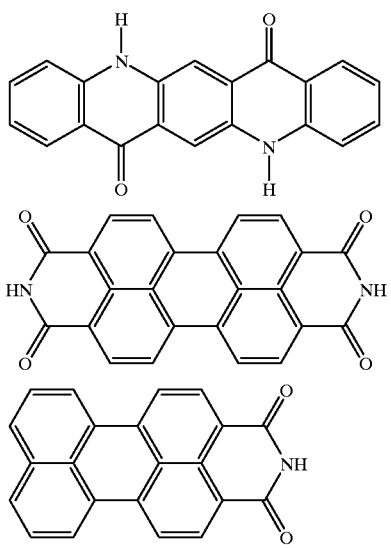

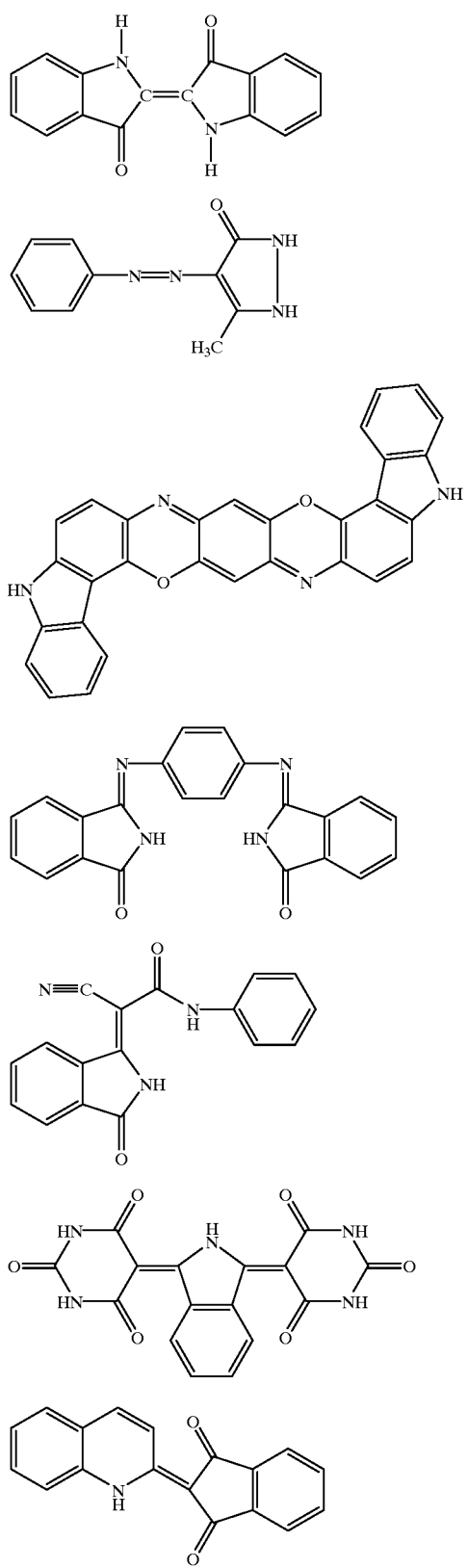
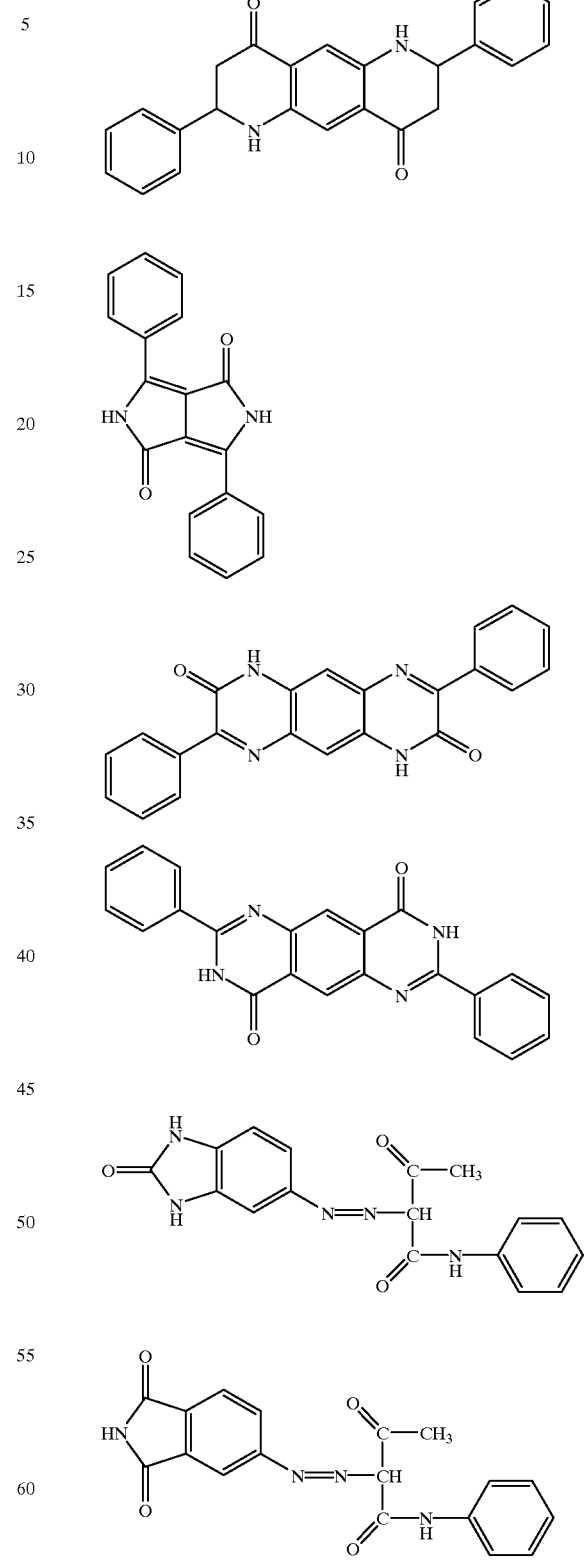

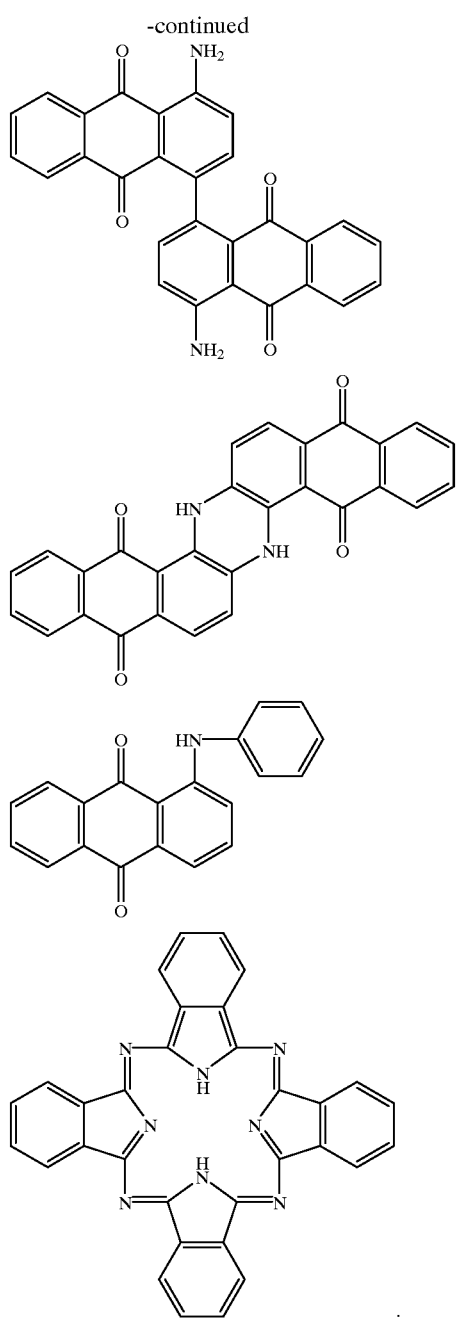
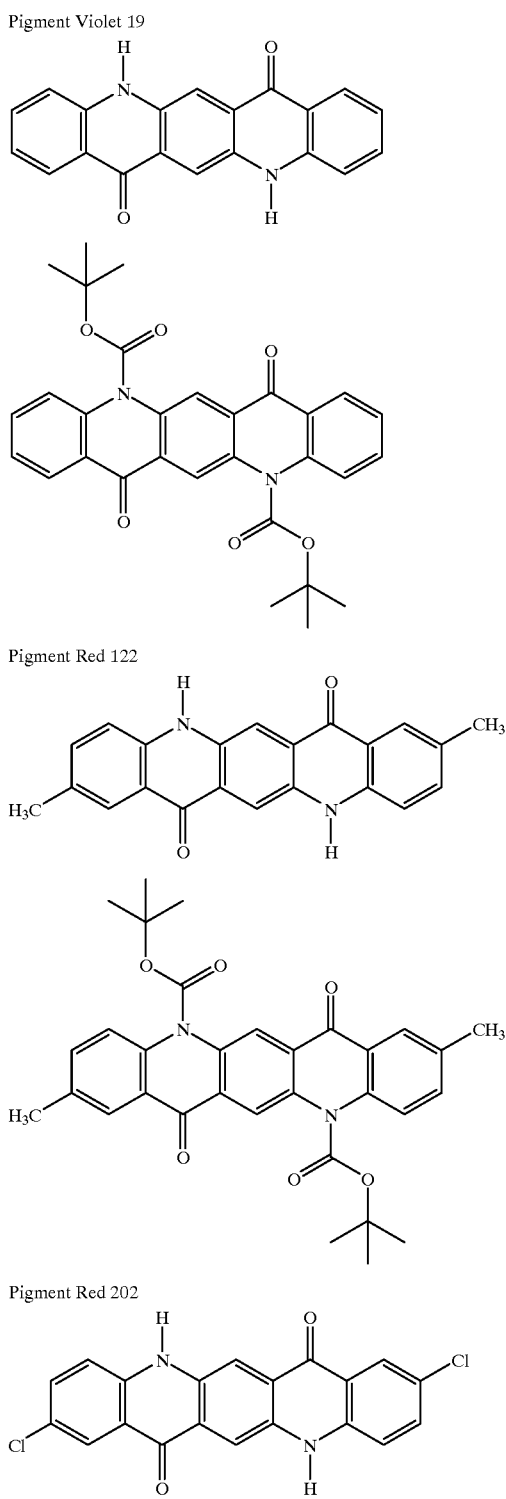
The pigment precursor may represent from about 0.1% to about 10%, preferably from about 1% to about 4%, by weight of the ink composition.
Examples of pigments (top structure) and their precursors (immediately below pigment structure) useful for ink-jet printing include:

Pigment Blue 60
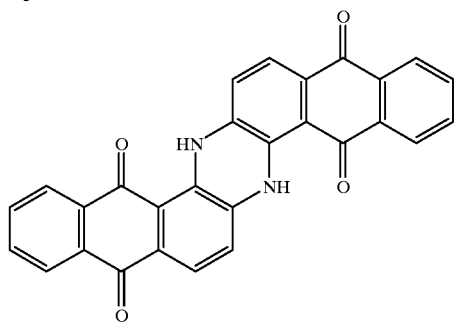
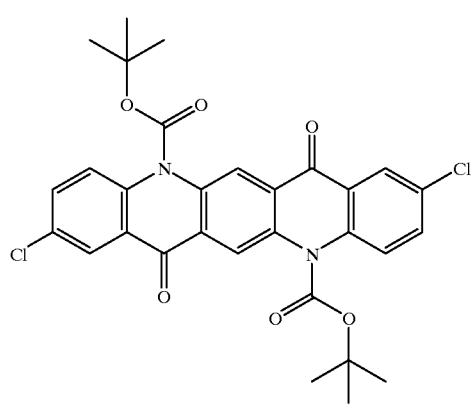
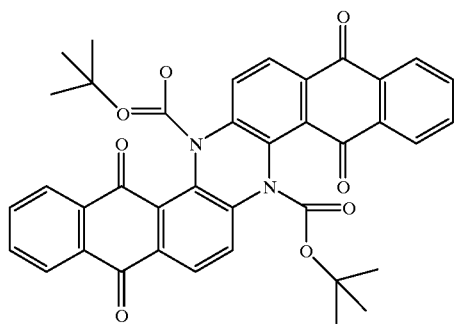
Pigment Red 209
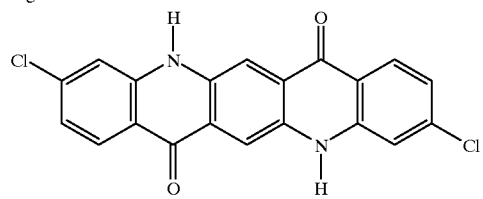
3,6-diphenyl-1,4-diketo-pyrrolo[3,4-c]pyrrole (DPP)
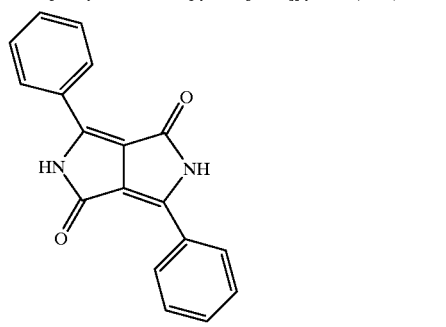
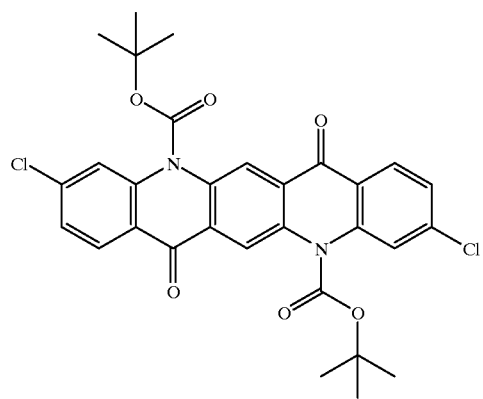
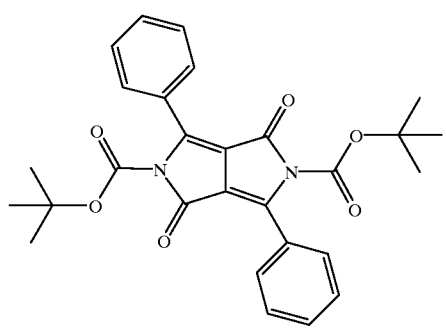
Pigment Brown 26
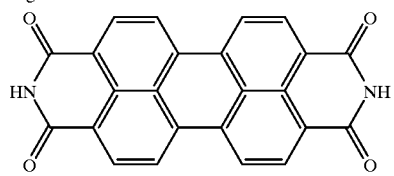
Indigo
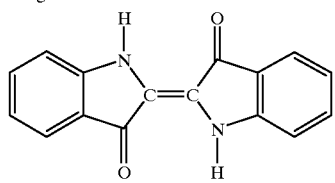
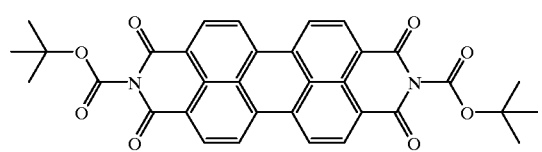

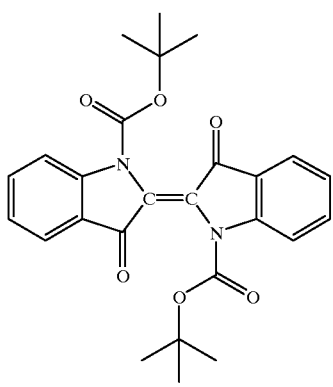

Pigment Red 177

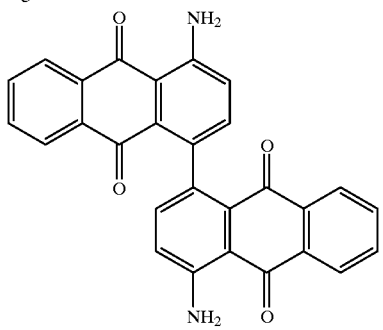

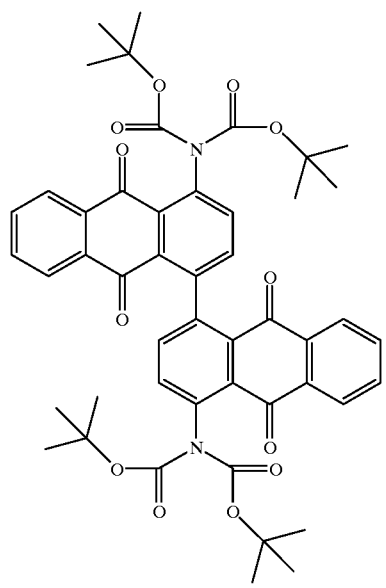

Pigment Yellow 139

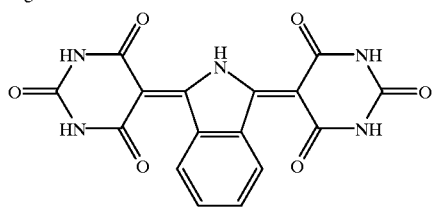

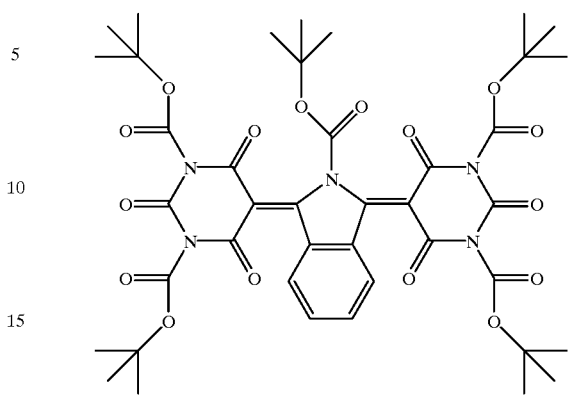

See U.S. Pat. No. 5,879,855, equivalent to EP 654,711 published May 24, 1995 and naming Schadell et al. as inventors, for a description of additional suitable pigment precursors.

Generation of the pigment from the precursor can be accomplished by any means known in the art to effect this reaction. Typical methods include thermal means such as a heated drum or fuser (heating to a temperature of from about 40C. to about 400C., preferably from about 100C. to about 250C.); photolytic means such as a light bar (exposure to light from about 200 mn to about 500 nm wavelengths, at a power of about 20–100 mJ/cm$^2$), or a laser (at wavelengths between about 200–600 nm, preferably from about 250–500 mn); or chemical treatment such as with suitable organic or inorganic acid or base.

Formation of the Pigment Precursor

The pigment precursor may be formed by any means commonly known. In general, the process involves the reaction of the pigment substructure wherein the reactive Nitrogen sites become bonded to one or more of the following reactants: dicarbonates, trihaloacetic acid esters, acid chlorides, N-hydroxysuccinimidyl esters/carbonates, carbonates, or alkylideneiminooxy formic acid esters. See U.S. Pat. No. 5,484,943 and U.S. Pat. No. 5,561,232 for examples of pigment precursor formation.

In one example, for the above pigment/pigment precursor structures, the pigment was reacted with di-(t-butyl)-dicarbonate to form the t-butoxy-carbonylated pigment precursor.

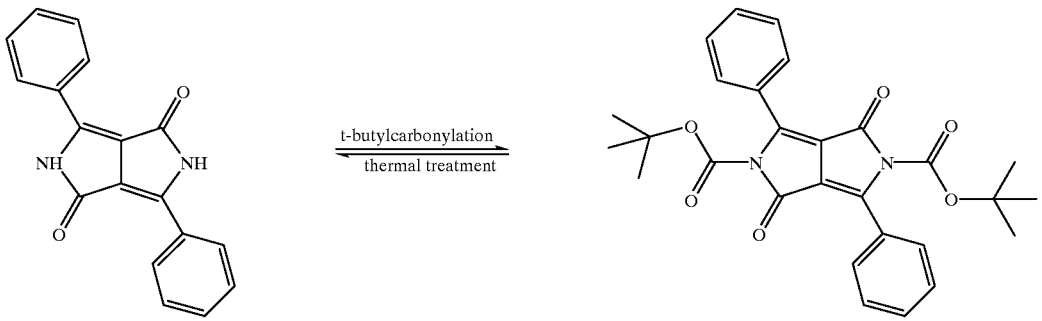

Two-Phase System

The ink-jet inks herein may preferably be formulated in a two-phase system with one of the phases consisting of water. This allows for a less expensive ink formulation and reduced environmental and toxicity concerns due to a reduction in the amount of organic solvents utilized. Reduced organic solvent concentrations in the inks also reduces flammability, solvent odor and materials compatibility difficulties with the ink-jet pen.

Two-phase ink-jet ink vehicles consist of two liquid phases: the discontinuous nonaqueous phase and the continuous aqueous phase. The pigment precursor will be present in the discontinuous phase. Unlike earlier microemulsions comprising pigments, the use of a pigment precursor solubilized in the discontinuous phase alleviates the need to modify the colloidal pigment surface or otherwise employ a dispersing agent to deagglomerate the pigment. Thus, the ink-jet ink composition of the present invention may be in the form of a continuous aqueous phase and a discontinuous phase; said discontinuous phase comprises a pigment precursor and a water-insoluble organic compound. At least one amphiphile is preferably present in both phases. Optionally, at least a second organic compound miscible with both phases is present. The amphiphile, if present, is chosen based on the type of two-phase system desired. In general, a hydrotrope, in an amount that completely solubilizes the water-insoluble organic compound, results in a clear, stable microemulsion as in area B of the figure. Taken in different proportions, the hydrotrope may form an emulsion as in area A of the Figure. If the amphiphile is a surfactant, typically the two-phase system may result in a microemulsion, an emulsion or a liposomal dispersion. Those skilled in the art of two-phase chemistry will be able to readily select the proper amphiphile for the desired system.

It is believed that hydrotropes will generally provide a thermodynamically stable, isotropic microemulsion solution wherein the resulting isotropic solution occupies a relatively large area in the phase diagram and has a relatively high surface tension in comparison to that of solutions made by the use of surfactants. Typically, for improved print quality on a paper medium, a hydrotrope should be employed to solubilize the water-insoluble organic compound. On the other hand, if a lesser print quality is acceptable, such as printing on textile media, one may employ surfactants to solubilize the water-insoluble organic compound.

Furthermore, it is believed that the reliability of the ink-jet pen is enhanced by the use of a second organic compound that is miscible with both the aqueous and the nonaqueous, organic phases. It is believed that the optional second organic compound inhibits the formation of crusts or beards on the nozzle plate and thus, enhances the pen reliability.

When a pen containing an ink of this invention idles, water (but not the high boiling, water-insoluble organic compound or the high boiling, second organic solvent) evaporates from the nozzles. The presence of the water-miscible second organic solvent inhibits crust formation (also known as beards in worst cases), resulting from the material that is present in the continuous phase. This inhibition of crust formation by the second organic compound enhances the reliability of the ink-jet pen.

Miscible organic solvent—The second organic solvent, or co-solvent, is miscible with both the discontinuous and the continuous phase. Organic solvents suitably employed in the present invention include, but are not limited to, alkanolamines; lactams such as 2-pyrrolidone; glycols; diols such as 1,2- or 1,5-pentanediol; triols; glycol esters; mono- and diglycol ethers, including ethylene glycol mono butyl ether, diethylene glycol ethers, diethylene glycol mono ethyl, butyl, hexyl ethers, propylene glycol ether, dipropylene glycol ether, and triethylene glycol ether; mid chain alcohols such as 2-pentyl alcohol; oxyalkylated alcohols such as Alfonic 610-3.5 or 810-2 available from Vista Chemical Co. (Houston, Tex.); acetylenic polyethylene oxides, and polyethylene and polypropylene oxides. The second solvent may represent from about 0.1% to about 20% by weight of the ink composition. Preferably it may represent from about 0.1% to about 15%, and more preferably from about 0.1 % to about 10% of the ink composition. Triethanolamine (TEA), pentanediol (PDIOL), 2-pyrrolidone (2P), or mixtures thereof are preferred.

Amphiphile—Amphiphiles are used to solubilize water-insoluble compounds. Within the two-phase composition, the function of the amphiphile is to lower the interfacial tension between water and the water-insoluble organic compound, thereby forming a stable system. Amphiphiles mainly reside at the oil-water interface; however, they also reside in the aqueous phase due to their solubility in water (especially so in the case of hydrotropes).

For microemulsions, the most preferred class of amphiphiles herein are hydrotropes; however, the amphiphile employed may be any amphiphile that yields a microemulsion of the water-insoluble organic compound and the water. Suitable hydrotropic amphiphiles, like other surfactants in general, solubilize the water-insoluble organic compound in water by breaking the compound into very small droplets and maintaining these droplets in a microemulsion. However, unlike other classes of surfactants, hydrotropic amphiphiles yield relatively large microemulsion regions in the phase diagram, thus making them more suitable for ink-jet applications—large microemulsion region in the phase diagram translates to wider range of vehicle compositions to choose from for formulating the ink. A large microemulsion region in the phase diagram also provides for more robust ink compositions such that changes in the composition (e.g., due to evaporation) during pen idle do not adversely affect the pen.

Examples of amphiphiles for use herein include those selected from amine oxides, such as N,N-dimethyl-N-dodecyl amine oxide (NDAO), N,N-dimethyl-N-tetradecyl amine oxide (NTAO); N,N-dimethyl-N-hexadecyl amine oxide (NHAO); N,N-dimethyl-N-octadecyl amine oxide (NOAO); and N,N-dimethyl-N-(Z-9-octa-decenyl)-N-amine oxide (OOAO).

Examples of common non-hydrotropic amphiphiles (surfactants) include alkyl sulfonates, alkyl substituted benzene sulfonates, naphthalene sulfonates, alkylamine oxides, substituted ammonium salts, and the non-ionics.

The hydrotropic amphiphile may be anionic, cationic, or non-ionic in nature. Examples of anionic hydrotropic amphiphiles suitably employed in the practice of the invention include, but are not limited to, salts of benzoic acid, salicylic acid, benzene acid, benzene disulfonic acid, toluene sulfonic acid, xylene sulfonic acid, cymene sulfonic acid, cinnamic acid, octane sulfonic acid, hexane sulfonic acid, butane sulfonic acid, and decane sulfonic acid. The cation associated with these salts may be $Na^+$, $K^+$, $Li^+$, or $NH_4^+$.

Examples of cationic hydrotropic amphiphiles suitably employed in the practice of the invention include, but are not limited to, p-amino benzoic acid hydrochloride, procaine hydrochloride, caffeine; and salts of alkylpyridium, alkyltrimethyl ammonium, benzyltrialkyl (C1 to C4) ammonium, and phenyltrimethyl ammonium cations. The anion associated with these salts may be any of the halides, particularly C1.

Examples of non-ionic hydrotropic amphiphiles suitably employed in the practice of the invention include, but are not limited to, resorcinol and pyrogallol.

The proper amount of amphiphile in the two-phase system is that amount that solubilizes the water-insoluble organic compound. It is noted that a mixture of amphiphiles may be employed in the practice of the invention. The determination of the amount of a given amphiphile and its concentration is considered not to constitute undue experimentation in view of the teachings of this invention.

Microemulsions—The amount of amphiphile appropriately employed in a particular two-phase system may be determined in at least two ways, namely by an abbreviated method or a more systematic method. In the abbreviated method, one must first combine the water-insoluble organic compound(s), the optional second organic compound(s), and water in a ratio that reflects the desired final composition of the ink-jet ink composition. The resulting two-phase liquid (emulsion) is thereafter titrated with the selected amphiphile(s) until a clear microemulsion is obtained, representing the solubilization of the organic compound such that a single-phase solution is achieved. About 1% excess amphiphile may optionally be added to ensure a stable microemulsion. Thus, the appropriate relational concentrations of the water-insoluble organic compound(s), the second organic compound(s), water, and amphiphile(s) are determined through the above-described titration process.

In the event one chooses to determine the appropriate amount of amphiphile(s) in a more systematic approach, the first step involves the construction of a phase diagram to represent the combination of the water-insoluble organic compound, the second organic solvent, and water. More specifically, a phase diagram is constructed by combining water, the water-insoluble organic compound(s), and optional second organic solvent(s) in various proportions, titrating each mixture against the amphiphile(s) until a clear, single-phase region is determined within the phase diagram (the first end-point). By fuirther titrating beyond the first end-point, other regions of multi-phase or semi-solid compositions can be determined (the second end-point). These results, when plotted on a conventional triangular plot, represent a partial ternary phase diagram. Thus, one may select any composition from this single-phase region in the practice of the invention, provided the composition meets other criteria for the particular ink-jet ink application. The second organic solvent partitions between the continuous and discontinuous phases.

Liposomes—Liposome vesicles are well known in the art. In general the term "liposome forming material" refers to one or more primary components that actually comprise liposome vesicles. Typically, liposome forming materials have a polar end and a non-polar end. It is believed that the molecules organize themselves into a "bilayer" structure two molecules deep and oriented in such a way that each non-polar end interacts with another non-polar end and the polar ends are exposed to aqueous solution. Thus, the bilayers form vesicles containing an enclosed aqueous compartment.

Examples of liposome forming material are tocopherol succinate, tris(hydroxymethyl)amino methane or 2-amino-ethyl-1,3 propane diol. See U.S. Pat. No. 5,234,634 by inventors Janoff et al., incorporated herein by reference, for more detailed description of method relating to tocopherol vesicles. Other examples of liposome forming materials include phosphatidycholines, phosphatidic acids, phosphatidylserines, phosphatidylethanolamines, sphingolipids, phosphatidylglycerols, sphingomyelines, cardiolipins, glycolipids, gangliosides, cholesterol, cerebrosides, polyethylene glycol esters and ethers of fatty acids, and mixtures thereof.

Typically, the liposome forming materials comprise from about 1% to about 30%, by weight of the final ink composition. Preferred amounts are such that the ratio of pigment precursor to liposome forming material is between about 2:1 to about 3:1 by weight. Any standard method for enclosing or encapsulating water-insoluble materials may be used. See *Liposome Technology,* published by CRC Press in 1993, hereby incorporated by reference, for a discussion of standard materials and techniques.

Additional Additives

Consistent with the requirements for this invention, various types of additives may be employed in the ink to optimize the properties of the ink composition for specific applications. For example, as is well known to those skilled in the art, one or more biocides, fungicides, and/or slimicides (microbial agents) may be used in the ink composition as is commonly practiced in the art. Examples of suitably employed microbial agents include, but are not limited to, NUOSEPT (Nudex, Inc.), UCARCIDE (Union Carbide), VANCIDE (RT Vanderbilt Co.), and PROXEL (ICI America). Additionally, sequestering agents such as EDTA may be included to eliminate deleterious effects of heavy metal impurities, and buffer solutions may be used to control the pH of the ink. Surfactants may be added for the control of surface tension. Other known additives such as viscosity modifiers may be added to improve various properties of the ink compositions as desired.

Optionally, however, the compositions of this invention may be formulated substantially free of polymers, dispersants, resins, high molecular weight binders (having a MW of over about 10,000), and starches. By "substantially free" is meant less than about 2%, preferably less than about 1% by weight of the ink composition. Moreover, although a second miscible, organic solvent may be utilized in the two-phase systems of this invention, formulations, aqueous and especially nonaqueous formulations, are envisioned substantially free of the second solvent as well.

EXAMPLE I

A pigment suspension is prepared by adding 2.95 g (0.0102 mole) of 3,6-diphenyl-1,4-diketo-pyrrolo[3,4-c] pyrrole (DPP) to 100 ml of molecular sieve dried tetrahydrofuran. 5.59 g (0.0256 mole) of di-tert-butyldicarbonate and 0.65 g (0.00529 mole) of 4-dimethylaminopyridine (catalyst) are then added to the mixture. The red suspension is stirred for three hours at room temperature in the absence of moisture and results in a green solution. The solvent is then removed under vacuum, and the resulting yellow solid is washed with an aqueous 5% solution of sodium hydrogencarbonate, followed by a distilled water rinse. The product, N,N'-bis-(tert-butoxycarbonyl)-3,6-diphenyl- 1,4-diketopyrrolo[3,4-c]pyrrole is then dried under vacuum.

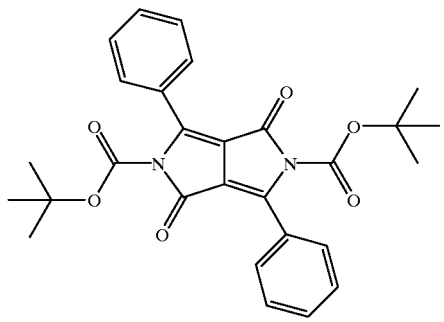

EXAMPLE II

A pigment suspension is prepared by adding 4.43 g (0.0153 mole) of 3,6-diphenyl-1,4-diketo-pyrrolo[3,4-c] pyrrole (DPP) to 150 ml of molecular sieve dried tetrahydrofuran. 9.46 g (0.0384 mole) of di-tert-pentyldicarbonate and 0.98 g (0.00794 mole) of 4-dimethylaminopyridine (catalyst) are then added to the mixture. The red suspension is stirred for three hours at room temperature in the absence of moisture and results in a green solution. The solvent is then removed under vacuum and the resulting solid is washed with an aqueous 5% solution of sodium hydrogencarbonate, followed by a distilled water rinse. The product, N,N'-bis-(tert-pentoxycarbonyl)-3,6-diphenyl-1,4-diketo-pyrrolo[3,4-c]pyrrole is then dried under vacuum.

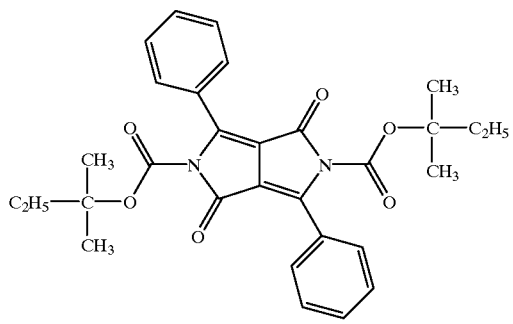

EXAMPLE III

A pigment suspension is prepared by adding 1.85 g (0.00504 mole) of C.I. Pigment Yellow 139 to 100 ml of molecular sieve dried N,N-dimethylformamide. 8.20 g (0.0376 mole) of di-tert-butyldicarbonate and 0.35 g (0.00286 mole) of 4-dimethylaminopyridine (catalyst) are then added to the mixture. The orange suspension is stirred for 7 days in the absence of moisture. The mixture is then added to 300 ml of chilled distilled water under vigorous stirring and mixed for 30–45 minutes. The mixture is then filtered, and the crude solid product is dissolved in 50 ml of methanol and filtered again to remove the insoluble part. 250 ml of distilled water is added to the filtrate. The resulting precipitate is then removed by filtration and dried under vacuum.

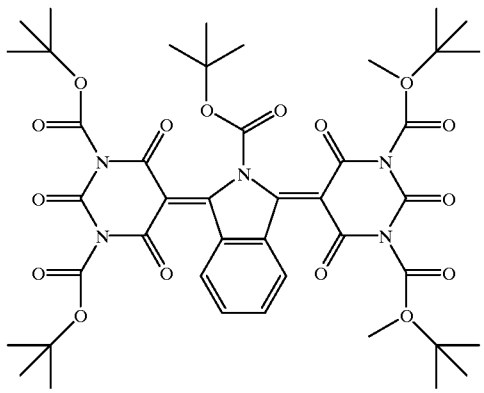

EXAMPLE IV

A pigment suspension is prepared by adding 1.88 g (0.00405 mole) of C.I. pigment red 177 to 100 ml of molecular sieve dried N,N-dimethylformamide. 12.13 g (0.0556 mole) of di-tert-butyldicarbonate and 0.23 g (0.00188 mole) of 4-dimethyl-aminopyridine (catalyst) are then added to the mixture and stirred at room temperature for 24 hours. The mixture is then poured into 250 ml of cold distilled water and stirred rapidly for 30 minutes. The yellow precipitate is then washed with distilled water and dried under reduced pressure at room temperature.

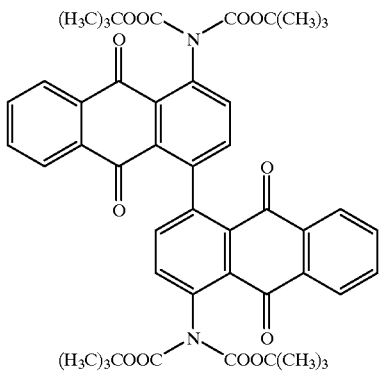

EXAMPLE V 3.0 g of N,N'-bis-(t-butoxycarbonyl)-3,6-diphenyl-1,4-diketo-pyrrolo[3,4-c]pyrrole (see Example I) is dissolved in 97.0 g of Xylene. The resulting ink composition is mixed for 8 hours.

The ink formulation is added to a conventional ink-jet cartridge and used to print on plain paper with either a thermal ink-jet or piezo ink-jet printer. After printing, the printed paper is run through a fuser (as used in laser printers) at a temperature of 180–190C. at a rate of 10 mm/sec. The printed pigment precursor is transformed from yellow into the native red pigment by gaseous elimination of carbon dioxide and isobutene and becomes readily observable on the printed page. The ink composition provides a high-quality print with little or no bleeding and permanence equivalent to conventional ink formulations using the native pigment. Further it has a quick drying time.

EXAMPLE VI 3.0 g of N,N'-bis-(t-butoxycarbonyl)-3,6-diphenyl-1,4-diketo-pyrrolo [3,4-c]pyrrole(see Example I) is dissolved in 30.0 g of ethylene glycol monophenyl ether. After dissolution, the pigment precurser solution is then added to a solution of 8.0 g of sodium xylene sulfonate in 59.0 g of deionized water and mixed thoroughly to form a microemulsion.

The resulting microemulsion ink formulation is added to a conventional ink-jet cartridge and used to print on plain paper with either a thermal ink-jet or piezo ink-jet printer. After printing, the printed paper is run through a fuser (as used in laser printers and copiers) at a temperature of 180–190C. at a rate of 10 mm/sec. The yellow pigment precursor is transformed back to the native red pigment by gaseous elimination of carbon dioxide and isobutene and becomes readily observable on the printed page. The ink composition provides a high-quality print with little or no bleeding and permanence equivalent to conventional ink formulations using the native pigment. Further it has a quick drying time.

EXAMPLE VII 3.0 g N,N'-bis-(t-butoxycarbonyl)-3 ,6-diphenyl-1 ,4-diketo-pyrrolo[3 ,4-c]pyrrole(see Example I) is dissolved in 30.0 g of ethylene glycol monophenyl ether. After dissolution, the pigment precursor solution is then added to a solution of 5.0 g of sodium xylene sulfonate in 62.0 g of deionized water and mixed thoroughly to form an emulsion.

The resulting emulsion ink formulation is added to a conventional ink-jet cartridge and used to print on plain paper with either a thermal ink-jet or piezo ink-jet printer. After printing, the printed paper is run through a fuser (as used in laser printers and copiers) at a temperature of 180–190C. at a rate of 10 mm/sec. The yellow pigment precursor is transformed back to the native red pigment by gaseous elimination of carbon dioxide and isobutene and becomes readily observable on the printed page. The ink composition provides a high-quality print with little or no bleeding and permanence equivalent to conventional ink formulations using the native pigment. Further it has a quick drying time.

EXAMPLE VIII 36.0 g of N,N'-bis-(t-butoxycarbonyl)-3,6-diphenyl-1,4-diketo-pyrrolo[3,4-c]pyrrole(see Example I) is dispersed in 100 g of cyclopentanone. The pigment precursor dispersion is then mixed with 415 g deionized water, 36.0 g of diethylene glycol, 10.6 g vitamin E succinate, and 2.4 g tris buffer. This mixture is then microfluidized at a pressure of 10,000 psi until the particle size is reduced to 125 nm. 75.0 g of the above pigment concentrate is then diluted with 25.0 g of 4% Triton CF21 surfactant in deionized water to give the final ink.

The resulting ink formulation is added to conventional ink-jet cartridges and used to print on plain paper with either a thermal ink-jet or piezo ink-jet printer. After printing, the printed paper is run through a fuser (as used in laser printers and copiers) at a temperature of 180–190C. at a rate of 10 mm/sec. The yellow pigment precursor is transformed back to the native red pigment by gaseous elimination of carbon dioxide and isobutene and becomes readily observable on the printed page. The ink composition provides a high-quality print with little or no bleeding and permanence equivalent to conventional ink formulations using the native pigment.

INDUSTRIAL APPLICABILITY

The present ink-jet ink compositions and method for controlling bleed and reducing dry time with enhanced reliability in ink-jet printing as disclosed herein are expected to find commercial use in ink-jet printing. It will be readily apparent to those skilled in the art that various changes and modifications of an obvious nature may be made without departing from the spirit of the invention. All such changes and modifications are considered to fall within the scope of the invention as defined by the appended claims.

What is claimed is:

1. A pigment-based ink composition for use in ink-jet printing comprising:
   a) a water-insoluble organic compound; and
   b) a pigment precursor which can be converted to an insoluble pigment by chemical, thermal, photolytical, or radiation means;
   wherein said pigment precursor is solubilized is said organic compound and wherein said ink composition is substantially free of polymers, dispersants, resins, and starches.

2. The composition of claim 1 wherein said water-insoluble organic compound is selected from the group consisting of water-insoluble ethyleneoxy oils, water-insoluble propyleneoxy oils, water-insoluble monoglycol ethers, water-insoluble polyglycol ethers, water-insoluble monoglycol phenyl ethers, water-insoluble polyglycol phenyl ethers, water-insoluble alcohols, water-insoluble monoglycol esters, water-insoluble polyglycol esters, water-insoluble terpenes, water-insoluble phenols, water-insoluble aldehydes and ketones, water-insoluble polyether modified polysiloxanes, water-insoluble hydrocarbons, and mixtures thereof.

3. The composition of claim 2 wherein said one water-insoluble organic compound is selected from the group consisting of monoethylene glycol phenyl ethers, polyethylene glycol phenyl ethers, monopropylene glycol phenyl ethers, polypropylene glycol phenyl ethers, ethylene glycol esters, propylene glycol esters, polyethylene glycol esters, polypropylene glycol esters, toluene, xylenes, naphthalene, phenanthrene, benzyl alcohol, alpha-terpineol, citronellal, hydroxy citronellal, cyclohexyl methanol, cyclohexanone and its (C1 to C8) derivatives, cyclohexanol and its alkyl (C1 to C8) derivatives, cyclopentanone and its (C1 to C8) derivatives, cyclopentanol and its alkyl (C1 to C8) derivatives, eugenol, 1-heptanol, n-hexanol, 2-hexanol, n-pentanol, cinnamyl alcohol, cinnamaldehyde, m-cresol, 3-phenyl-1-propanol, salicylaldehyde, 2-ethyl-1,3-hexanediol, 7-octene-1,2-diol, 2,2-diethyl-1,3-propanediol, 1-benzyl-2-pyrrolidinone, polycaprolactone triol, 3-phenyl-1-propanol, and mixtures thereof.

4. The composition of claim 1 wherein said pigment precursor is derived from a pigment substructure of known nitrogen containing chromophores.

5. The composition of claim 4 wherein said nitrogen containing chromophore substructure is selected from the group consisting of quinacridone-, anthraquinone-, perylene-, indigo-, quino-phthalone-, isoindolinone-, isoindoline-, dioxazine-, diketopyrrolopyrrole-, phthalocyanine-, azo series, and mixtures thereof.
6. The composition of claim 5 wherein said substructures have the formulae:
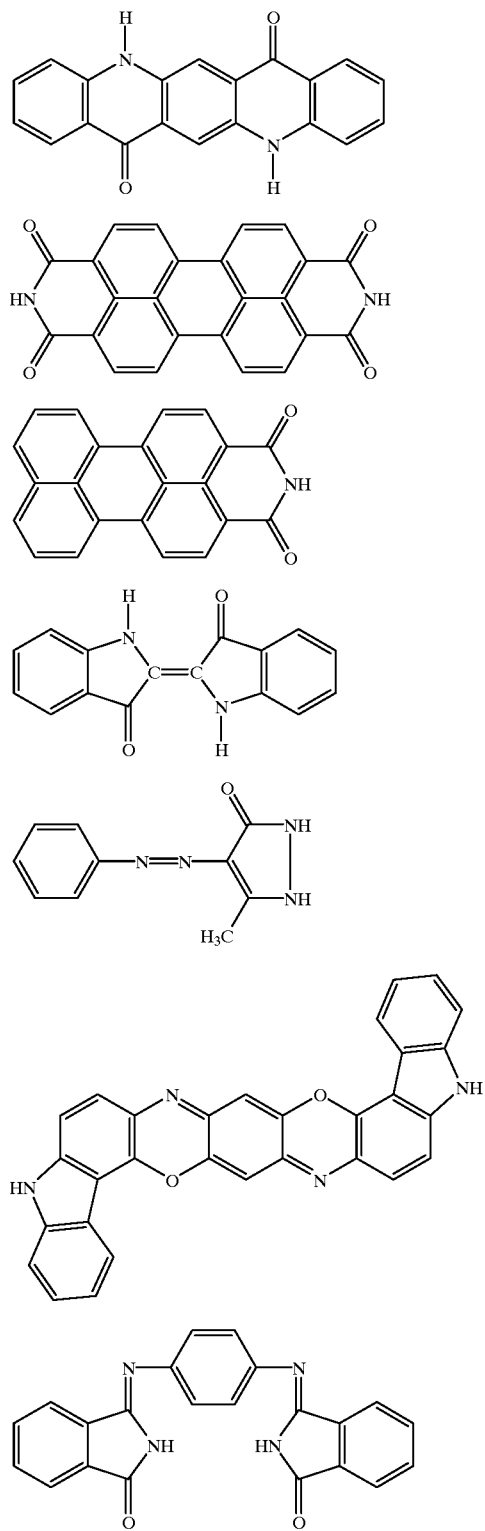
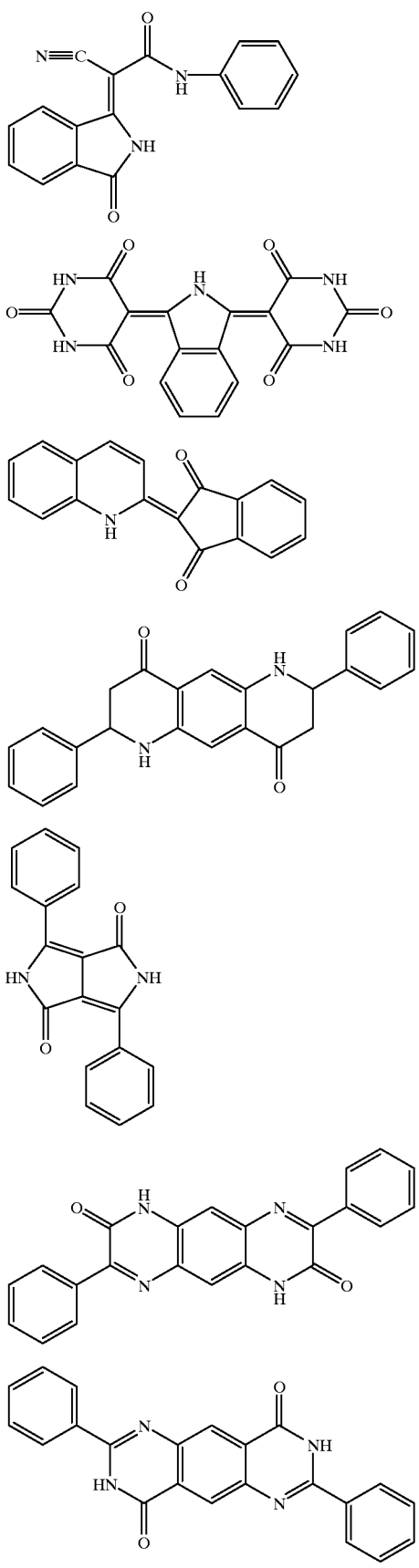

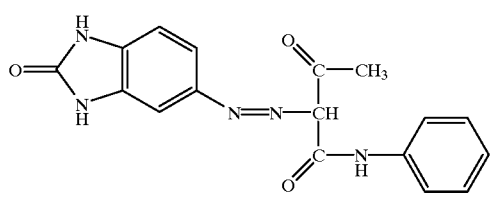

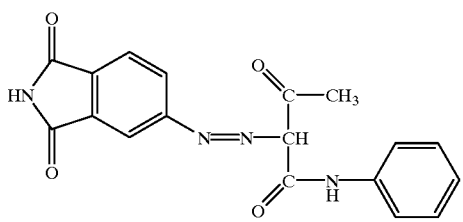

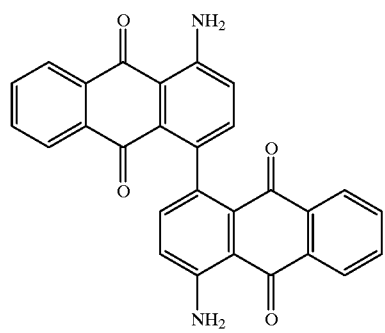

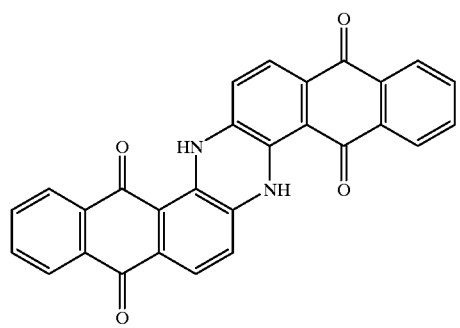

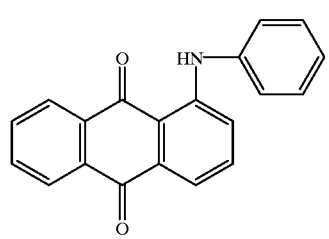

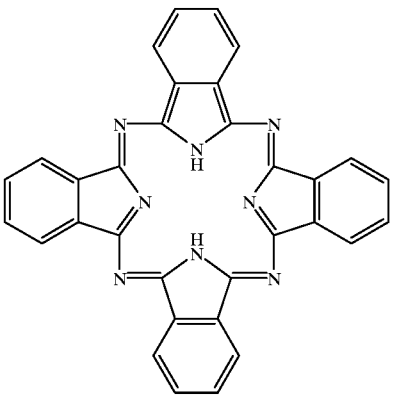

7. The composition of claim 1 wherein said water-insoluble organic compound is present in said ink composition in an amount ranging from about 1% to about 99% by weight and wherein said pigment precursor is present in said ink-jet composition in an amount ranging from about 0.1% to about 10% by weight.

8. A pigment-based ink composition comprising:
   a) a water-insoluble organic phase comprising;
      1) at least one water-insoluble organic compound; and
      2) at least one pigment precursor which can be converted to an insoluble pigment by chemical, thermal, photolytical, or radiation means; and
   b) a water phase;
   wherein said ink is a two-phase composition and wherein said ink composition is substantially free of polymers, dispersants, resins, and starches.

9. The composition of claim 8 further comprising at least one amphiphile wherein said amphiphile is present in an amount sufficient to solubilize said water-insoluble organic compound.

10. The composition of claim 9 wherein said at least one amphiphile is selected from the group consisting of alkyl sulfonates, alkyl substituted benzene sulfonates, naphthalene sulfonates, alkylamine oxides, substituted ammonium salts, non-ionic surfactants, and mixtures thereof.

11. The composition of claim 9 wherein said composition is a microemulsion.

12. The composition of claim 9 wherein said composition is an emulsion.

13. The composition of claim 11 wherein said amphiphile is hydrotropic and is selected from the group consisting of salts of benzoic acid, salicylic acid, benzene sulfonic acid, benzene disulfonic acid, toluene sulfonic acid, xylene sulfonic acid, cumene sulfonic acid, cymene sulfonic acid, cinnamic acid, octane sulfonic acid, hexane sulfonic acid, butane sulfonic acid, decane sulfonic acid, p-amino benzoic acid hydrochloride, procaine hydrochloride, caffeine, salts of alkylpyridium, alkyltrimethyl ammonium, benzyltrialkyl (C1 to C4) ammonium, phenyltrimethyl ammonium cations, resorcinol, pyrogallol, and mixtures thereof.

14. The composition of claim 13 wherein said hydrotropic amphiphile is selected from the group consisting of sodium xylene sulfonate, sodium salicylate, sodium benzoate, and mixtures thereof.

15. The composition of claim 8 further comprising a second organic compound that is miscible with both the water phase and the organic phase.

16. The composition of claim 15 wherein said second organic solvent is selected from the group consisting of alkanolamines, lactams, glycols, diols, triols, glycol esters, mono-glycol ethers, di-glycol ethers, mid chain alcohols, oxyalkylated alcohols, acetylenic polyethylene oxides, polyethylene oxides, polypropylene oxides, and mixtures thereof.

17. The composition of claim 16 wherein said second organic solvent is selected from the group consisting of 2-pyrrolidone, 1,2-pentanediol, 1,5-pentanediol, ethylene glycol mono butyl ether, diethylene glycol ethers, diethylene glycol mono ethyl ether, diethylene glycol mono butyl ether, diethylene glycol mono hexyl ether, propylene glycol ether, dipropylene glycol ether, triethyleneglycol ether, 2-pentyl alcohol, acetylenic polyethylene oxide, polyethylene oxide, polypropylene oxide, and mixtures thereof.

18. The composition of claim 8 wherein said ink composition is in the form of a liposome.

19. A method of ink-jet printing comprising:

1) providing a pigment-based ink-jet ink composition comprising:
    a) a water-insoluble organic phase comprising;
        i) at least one water-insoluble organic compound; and
        ii) at least one pigment precursor which can be converted to an insoluble pigment by chemical, thermal, photolytical, or radiation means; and
    b) a water phase;
        wherein said ink is a two-phase composition and wherein said ink composition is substantially free of polymers, dispersants, resins, and starches; and
2) printing said ink composition on a printing medium by means of an ink-jet pen.

20. A method for ink-jet printing according to claim 19 further comprising the step of locally regenerating the pigment from the pigment precursor by chemical, photolytical, thermal, by laser, or by a source of irradiation.

* * * * *